US010635350B2

(12) United States Patent
Singhal et al.

(10) Patent No.: US 10,635,350 B2
(45) Date of Patent: Apr. 28, 2020

(54) TASK TAIL ABORT FOR QUEUED STORAGE TASKS

(71) Applicant: Western Digital Technologies, Inc., San Jose, CA (US)

(72) Inventors: Prashant Singhal, Bangalore (IN); Vallivelraja Ponnudurai, Tamil Nadu (IN); Anil Jain, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 26 days.

(21) Appl. No.: 15/878,114

(22) Filed: Jan. 23, 2018

(65) Prior Publication Data

US 2019/0227742 A1 Jul. 25, 2019

(51) Int. Cl.
*G06F 12/02* (2006.01)
*G06F 3/06* (2006.01)

(52) U.S. Cl.
CPC .......... *G06F 3/0659* (2013.01); *G06F 3/0607* (2013.01); *G06F 3/068* (2013.01); *G06F 3/0634* (2013.01); *G06F 3/0679* (2013.01); *G06F 12/02* (2013.01); *G06F 12/0246* (2013.01); *G06F 2212/7201* (2013.01)

(58) Field of Classification Search
CPC ............................. G06F 12/0246; G06F 12/02
USPC ........................................................ 711/103
See application file for complete search history.

(56) References Cited

U.S. PATENT DOCUMENTS

| 5,991,825 A * | 11/1999 | Ng ......................... G06F 3/0611 |
| | | 710/39 |
| 6,272,606 B1 * | 8/2001 | Dorricott ............. G11B 27/002 |
| | | 711/111 |
| 9,996,262 B1 * | 6/2018 | Nemawarkar ........ G06F 3/0604 |
| 2015/0186068 A1 * | 7/2015 | Benisty ................. G06F 3/0673 |
| | | 711/154 |
| 2015/0234601 A1 * | 8/2015 | Tsai ....................... G06F 3/0611 |
| | | 711/103 |
| 2016/0034187 A1 * | 2/2016 | Desai ...................... G06F 3/061 |
| | | 711/102 |
| 2016/0147592 A1 * | 5/2016 | Guddeti ................ H04L 1/0056 |
| | | 714/776 |
| 2016/0378590 A1 | 12/2016 | Roh et al. |

(Continued)

OTHER PUBLICATIONS

Serial ATA, "Advanced Host Controller Interface," (AHCI) 1.3.1, Specification, Revision 1_3_1.doc, Nov. 2013, 137 pages.

(Continued)

*Primary Examiner* — Gautam Sain
(74) *Attorney, Agent, or Firm* — Vierra Magen Marcus LLP

(57) ABSTRACT

Technology is disclosed herein for aborting a tail portion of a command queue in a storage device. In one aspect, one or more control circuits of a storage system are configured to abort tasks at a tail end of a command queue in response to receiving a task tail abort command. However, tasks at the head end of the command queue may still be executed. Thus, the head end of the command queue need not be rebuilt after the task tail abort command is performed. Therefore, considerable time is saved by not having to rebuild the head end of the command queue. Note that the task tail abort command may be received while the storage system is in a sequential command execution mode, in which tasks are executed in the order of their respective task identifiers.

15 Claims, 12 Drawing Sheets

(56) References Cited

U.S. PATENT DOCUMENTS

2017/0199667 A1* 7/2017 Zia .......................... G06F 3/061
2017/0322897 A1* 11/2017 Benisty ................... G06F 13/37

OTHER PUBLICATIONS

SD Card Association, "SD Specifications: Part 1—Physical Layer Simplified Specification," version 6.00, Apr. 10, 2017, 263 pages.
NVM Express, Revision 1.3a, Oct. 24, 2017, 287 pages.
JEDEC Standard, Universal Flash Storage (UFS), Version 2.1, Mar. 2016, 382 pages.
JEDEC Standard, Embedded Multi-Media Card (e.MMC) Electrical Standard (5.0), Sep. 2013, 296 pages.

* cited by examiner

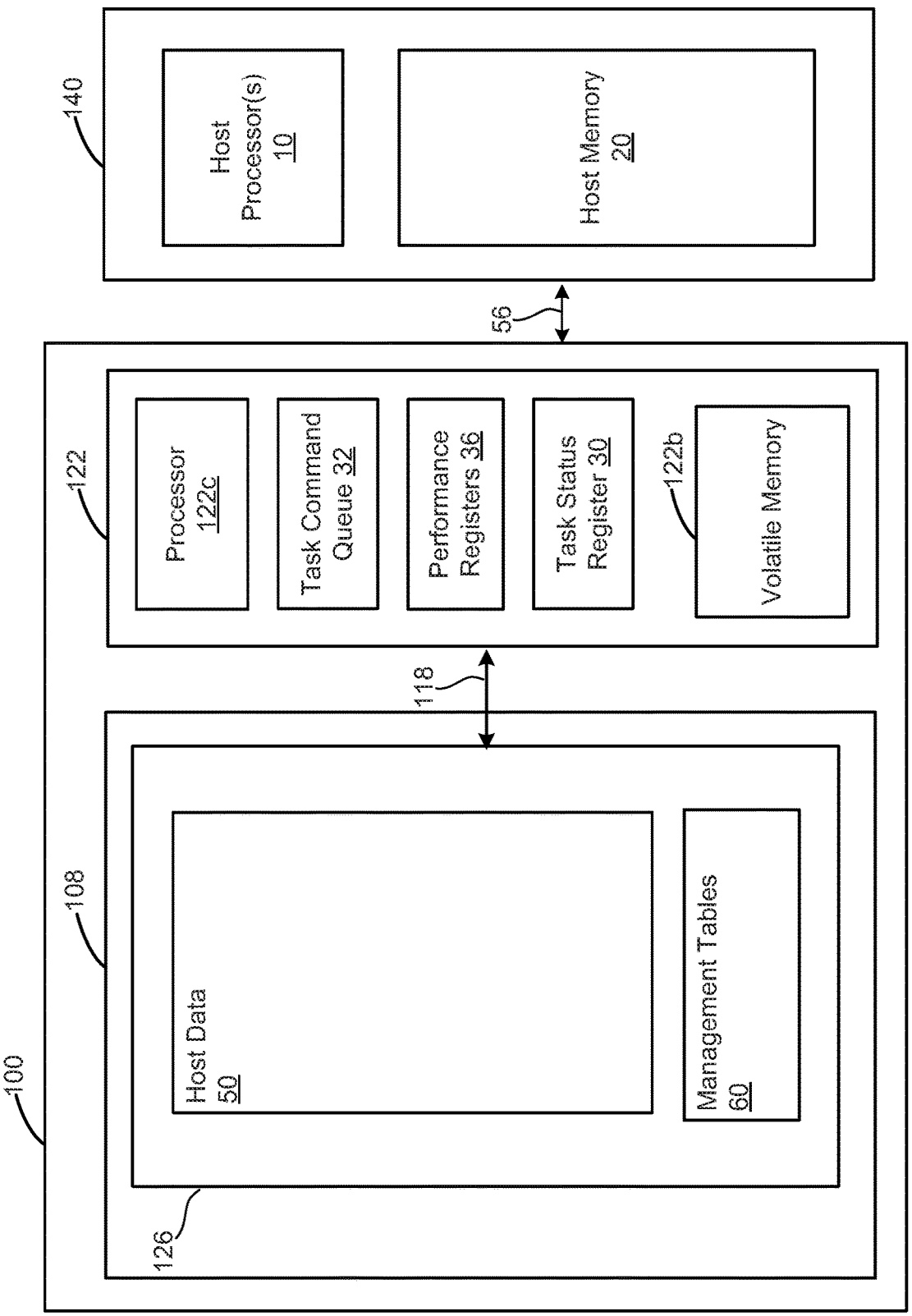

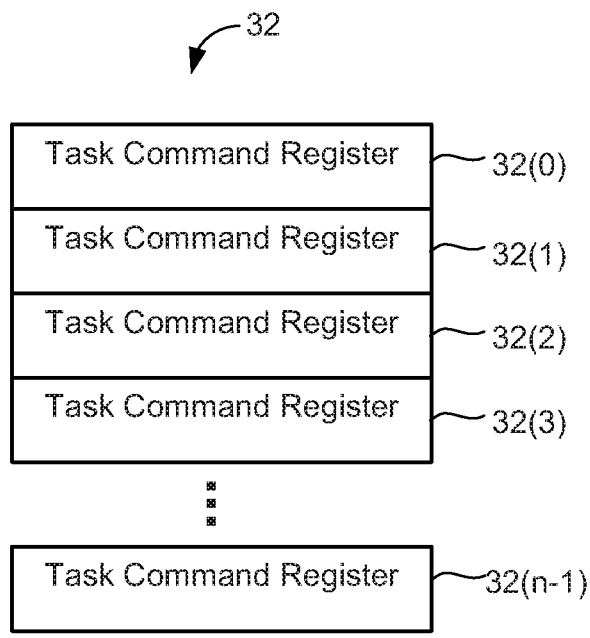
Figure 1B
Figure 1C
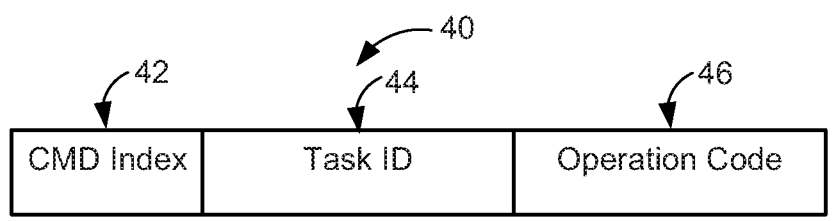
Figure 1D

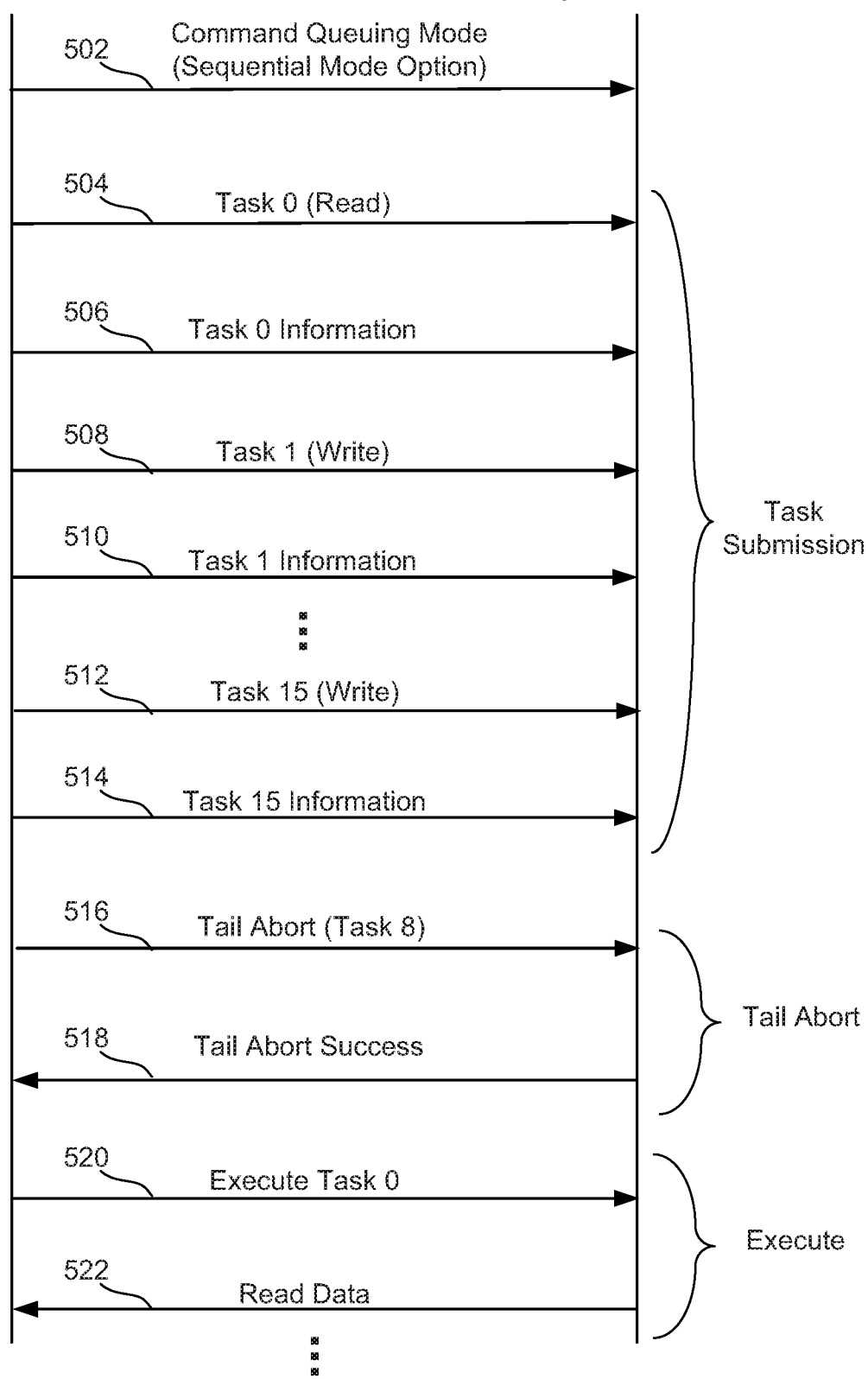

TASK TAIL ABORT FOR QUEUED STORAGE TASKS

BACKGROUND

Memory systems typically have a controller that manages access to storage. Herein, this controller will be referred to as a "memory controller." The storage could have flash memory cells (e.g., NAND, NOR), resistive random access memory (ReRAM or RRAM), phase change memory (e.g., PCM), etc. The memory controller receives memory access commands (e.g., read, write) from a host. The memory access commands typically indicate a starting logical address and a data length. The starting logical address could be a logical block address (LBA). The data length could be specified in a data unit, such as a block. The size of a block can vary from one implementation to the next. The memory controller translates the logical addresses to physical addresses in the storage. As one example, a flash memory device has a Flash Transfer Layer (FTL) or Media Management Layer (MML) that performs a logical address to physical address translation.

In some modes of operation a memory system, the memory controller does not queue memory access commands from the host. Rather, the memory system receives a memory access command from the host, executes the memory access command, and sends a response to the host. Then, the host sends another command to be executed. For example, the memory system receives a read command, as well as logical address and data length, from the host. The memory system senses the data from the storage and provides that data to the host. Then, the host sends another read or write command.

In other modes of operation a memory system, the memory controller maintains a command queue of memory access commands from a host. It is common to refer to the memory access requests from the host as "tasks." Hence, this command queue may be referred to herein to as either a "task command queue" or a "command queue." A task could include multiple commands from the host. For example, the host might send one command to indicate a read is requested, another command to provide the logical address and data length, and still another command to execute the read.

BRIEF DESCRIPTION OF THE DRAWINGS

FIG. 1A is a block diagram depicting one embodiment of a storage device connected to a host device.

FIG. 1B depicts one embodiment of task command queue, which may be used in the controller 122 of FIG. 1A.

FIG. 1C depicts one embodiment of a task status register, which may be used in the controller 122 of FIG. 1A.

FIG. 1D depicts one embodiment of a structure that may be used for a task tail abort command.

FIG. 5 depicts one example of information flow between a host and a memory device when processing tasks.

DETAILED DESCRIPTION

Figure 2A:
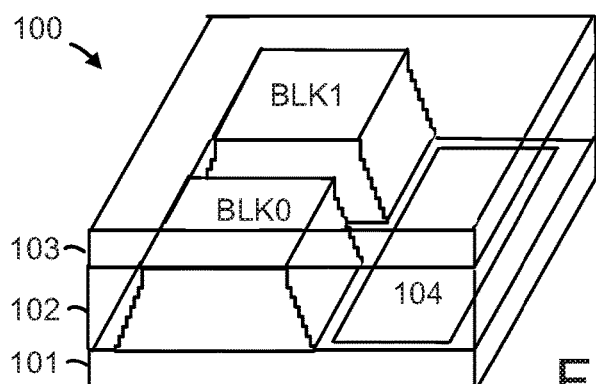
FIG. 2A is a perspective view of a three dimensional (3D) stacked non-volatile memory device.

Storage devices, and methods for use therewith, are described herein. Such storage devices can include flash memory (non-volatile memory), random access memory (RAM), and a memory controller in communication with the flash memory and the RAM. In accordance with certain embodiments of the present technology, one or more control circuits of a storage system are configured to abort tasks at a tail end of a command queue in response to receiving a task tail abort command. However, tasks at the head end of the command queue may still be executed. Thus, the head end of the command queue need not be rebuilt after the task tail abort command is performed. Therefore, considerable time is saved by not having to rebuild the head end of the command queue. Note that this is in contrast with conventional techniques that flush the entire command queue, and then need to rebuild the command queue. The task tail abort command may be received while the storage system is in a sequential command execution mode, in which tasks are executed in the order of their respective task identifiers. Moreover, note that some memory access specifications may only allow a flush of the entire command queue when in a sequential command execution mode.

One embodiment of a storage system has a communication interface configured to receive tasks from a host to access the non-volatile memory cells. Each of the tasks may have a task identifier. The storage system has one or more control circuits configured to execute tasks received over the communication interface in the order of the task identifiers, when in a sequential command execution mode. The one or more control circuits may place the tasks onto a command queue when in a command queuing mode. The storage system may receive a task tail abort command over the communication interface. The task tail abort command may be received while in the sequential command execution mode. The task tail abort command may have a specified task identifier. The one or more control circuits may be configured to abort a task having the specified task identifier and all tasks waiting to be executed having a task identifier greater than the specified task identifier in response to receiving the task tail abort command. After receiving the task tail abort command, the one or more control circuits execute at least one task waiting to be executed when the task tail abort command was received. The at least one task has a lower task identifier than the specified task identifier. Thus, the host need not resend the tasks having the lower task identifiers, thereby saving considerable time. For example, the host need not flush an entire command queue, followed by re-building the command queue. Re-building the command queue can take considerable time.

In some embodiments, the command queuing mode referred to in the previous paragraph is a Command Queue Mode in a version of the Secure Digital (SD) Specification For example, the Secure Digital (SD) Specification 6.0 supports command queuing. The Secure Digital (SD) Specification 6.0 (as well as other versions of the SD Specification) is provided by the SD Card Association. However, the command queueing mode is not required to be a Command Queue Mode of an SD Specification. In some embodiments, the sequential command execution mode referred to in the previous paragraph is a Sequential CQ mode in a Secure Digital Specification. However, the sequential command execution mode is not limited to being a Sequential CQ mode in a Secure Digital Specification. Moreover, the sequential command execution mode is not limited to a Secure Digital Specification.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a three digital reference number, and the first two digits of a four digit reference number, identifies the drawing in which the reference number first appears.

FIG. 1A is a block diagram depicting one embodiment of a storage system 100 connected to a host device 140 (or embedded in the host device 140) that can implement embodiments of the present technology described below. Referring to FIG. 1A, the host device 140 stores data into, and retrieves data from, the storage system 100 by issuing write and read commands. The storage system 100 may be embedded in the host device 140 or may exist in the form of a card, universal serial bus (USB) drive, or other removable drive, such as a solid state disk (SSD) that is removably connected to the host device 140 through a mechanical and electrical connector. The host device 140 may be any of a number of fixed or portable data generating devices, such as a personal computer, laptop computer, notepad computer, a smartphone, a digital still camera, a digital video camera, a personal digital assistant (PDA), a server, a set top box, or the like. More generally, the host device 140 can include host logic that performs the functions of a personal computer, laptop computer, notepad computer, a smartphone, a digital still camera, a digital video camera, PDA, server, set top box, etc. While not specifically shown, the host can include and/or be in communication with read only memory (ROM).

The host device 140, which can be referred to more succinctly as the host 140, may include one or more host processors 10. The host processors may run one or more application programs. The application programs, when data is to be stored on or retrieved from the storage system 100, may communicate through one or more operating system application programming interfaces (APIs) with a file system. The file system may be a software module executed on the processor(s) 10 and manages the files in the storage system 100. The file system manages clusters of data in logical address space. Common operations executed by a file system include operations to create, open, write (store) data, read (retrieve) data, seek a specific location in a file, move, copy, and delete files. The file system may be circuitry, software, or a combination of circuitry and software.

Communication channel 56 between the host 140 and the storage system 100 may be used to transfer commands, data, etc. The interface for communicating over the communication channel 56 may be any of a number of known interfaces, such as Secure Digital (SD), Multimedia Card (MMC), embedded Multimedia Card (eMMC), Universal Flash Storage (UFS), Universal Serial Bus (USB) storage device, Serial Advanced Technology Attachment (SATA) and Small Computer Systems Interface (SCSI) interfaces. The host 140 may maintain a logical address range for all logical block addresses (LBAs) that have been assigned by the host 140 to data. In addition to being used to refer to the communication channel between the host 140 and the storage system 100, the reference number 56 can also be used to refer to host interface signals that are communicated over the communication channel 56.

The host 140 uses the file system to address files stored within the storage system 100, which can involve writing data to and reading data from the non-volatile memory 126 of the storage system 100. Exemplary types of file systems that can be used by the host 140 include, but are not limited to, FAT32, exFAT, ext2/3, HFS+. The storage system 100 will typically be designed to work with different types of hosts, each of which may use a different type of file system.

The storage system 100 includes a memory controller 122 (which can also be referred to as the controller 122) in communication with one or more memory dies 108 via communication interface 118. Communication interface 118 may be any suitable interface, such as Open NAND Flash (ONFI) interface. However, note that the memory dies 108 could contain memory cells of a type other than NAND memory cells. The controller 122 has a processor 122c, volatile memory 122b, task status register 30, task command queue 32, and performance registers 36.

The task status register 30 and the task command queue 32 are each implemented in non-transitory storage. The non-transitory storage could be volatile memory or non-volatile memory. Although the task status register 30 and the task command queue 32 are depicted as being separate from volatile memory 122b, in some embodiments, the task status register 30 and/or task command queue 32 can be stored in the volatile memory 122b. The volatile memory 122b could be, for example, DRAM, SRAM, etc.

The task command queue 32 has a number of task command registers, in one embodiment. The task command queue 32 may be referred to more succinctly as a command queue. Note that a task may include the host 140 sending multiple commands to the memory system 100. The tasks may include tasks such as writing data to non-volatile memory 126, or reading data from non-volatile memory 126. In one embodiment, each task has a task identifier.

The performance registers 36 may include a first set of registers that define what features are supported by the memory system 100 and a second set of registers that allow the host 140 to enable or disable the features. The second set of registers may also indicate status of the features. In one embodiment, the features includes various modes in which commands are executed. The modes may include a command queue mode, in which the memory controller 122 uses the task command queue 32 to queue tasks from the host 140. The command queue mode may have a sequential mode and a voluntary mode. In one embodiment of the sequential mode, the tasks are executed in increasing order of the task identifiers. In one embodiment of the voluntary mode, the memory controller 122 is free to execute the tasks out of order of the task identifiers. The host 140 may cause the memory system 100 to enter a mode (e.g., command queue mode, sequential mode, voluntary mode) by writing to one or more of the performance registers 36, in one embodiment.

The tasks could be compliant with a number of protocols and/or specifications, including but not limited to, Secure Digital (SD), Multimedia Card (MMC), embedded Multimedia Card (eMMC), Universal Flash Storage (UFS), and Advanced Host Controller Interface (AHCI).

The memory controller 122 is configured to decode commands received from the host 140 and to store decoded commands in task command queue 32, in one embodiment. The memory controller is configured to associate a unique task ID with each task, in one embodiment. The unique task ID may be provided by host 140. In one embodiment, each task includes one or more task queuing commands, and a task execution command. The task queuing command may include a task set command and a task address command. A task set command could identify the task as a write or as a read, for example. One example of a task set command is CMD44 in a version of the Secure Digital (SD) Specification that supports command queuing. For example, Secure Digital (SD) Specification 6.0 supports command queuing. A task address command could identify a start address (e.g., logical block address), as well as a length. One example of a task set address is CMD45 in a version of the Secure Digital (SD) Specification that supports command queuing. Herein, when the term CMD44 or CMD45 is used, it will be understood that this is in reference to a version of the Secure Digital (SD) Specification that supports command queuing, such as Secure Digital (SD) Specification 6.0. However, note that other memory access specifications may have similar task set command and/or task address commands. Hence, although the reference to CMD44 and/or CMD45 will be understood as a reference to the Secure Digital (SD) Specification, it will be further understood that a reference herein to the Secure Digital (SD) Specification is not intended to limited embodiments disclosed herein to the Secure Digital (SD) Specification. Also, other memory access specifications support command queueing. Hence, the memory controller 122 can perform command queueing in accordance with memory access specifications other than the Secure Digital (SD) Specification.

The task status register 30 may be used to store status of each of the tasks. In some modes, the memory controller 122 may set an indicator in the task status register 30 to indicate that a task is ready for execution. In one embodiment, the term "ready for execution" is compliant with a version of the Secure Digital (SD) Specification that supports command queuing. However, the term "ready for execution" may be compliant with other memory access specifications. In some modes, the host 140 may instruct the memory system 100 to execute a task that has been marked by the memory system 100 as ready for execution. However, note that in some modes that host 140 may not need to check that a task is ready for execution prior to instructing the memory system 100 to execute the task. In some embodiments of a sequential mode, the host 140 does not need to check that a task is ready for execution prior to the shot instructing the memory system 100 to execute the task.

The memory die 108 has a memory structure 126. Note that there may be one or more memory dies. The memory structure 126 is used to store host data 50. The memory structure 126 is also used to store management tables 60. The management tables may include L2P (logical address to physical address) tables. Note that the volatile memory 122b may contain a cache of the L2P tables. Thus, if the memory controller 122 is processing a task and the LTP cache does not contain a needed entry, the memory controller 122 may fetch one or more entries from the L2P tables in memory access specifications.

FIG. 1B depicts one embodiment of task command queue 32, which may be used in the controller 122 of FIG. 1A. The task command queue 32 includes "n" separate task command registers 32(0)-32(n−1). The task command queue 32 may operate as an n-deep task queue, which could also be referred to as an "n-deep command queue."

Each task command register 32(0)-32(n−1) may store information for one task. For example, when a task set command (e.g., CMD44) is received, the memory controller 122 may decode the command and add information from decoding that command to one of the task registers. When a task address command (e.g., CMD45) for that same task is received, the memory controller 122 may decode that command and add information from decoding that command to the same task command register. Later, when a task execution command for that task is received from the host 140, the memory controller 122 may decode that command and add information from decoding the execution command to the task command register for that same task.

In one embodiment, the head end of the task command queue 32 is the lowest register 32(0). For example, in one embodiment, the memory controller 122 starts to fill the task command queue 32 with a task having a task identifier of 0 in task command register 32(0). However, the memory controller 122 is not required to fill the task command queue 32 starting at task command register 32(0).

FIG. 1C depicts one embodiment of a task status register 30, which may be used in the controller 122 of FIG. 1A. The task status register 30 contains "n" entries, such that there may be an entry for each of the task registers 32(0)-32(n−1). Each entry is able to store a value for the status of one of the tasks. The status includes at least two states: 1) ready for execution, and 2) not yet ready for execution, in one embodiment. There may be other possible states, such as, error. The term "ready for execution" means that the task is ready in accordance with the Secure Digital (SD) Specification 6.0, in one embodiment. However, the term "ready for execution" is not limited to a version of the Secure Digital (SD) Specification. The term "ready for execution" is also intended to cover other memory access specifications that include command queueing, including but not limited to eMMC, AHCI, and UFS.

FIG. 1D depicts one embodiment of a structure 40 that may be used for a task tail abort command. The structure 40 includes fields for a command index 42, task identifier 44, and operation code 46. The structure 40 could have other fields other than those shown in FIG. 1D. The structure 40 (with a suitable operation code, as described below) may be sent by the host 140 to the memory system 100 to instruct the memory system 100 to abort the tasks at the tail end of the command queue 32.

In one embodiment, the operation code field 46 can be set to different values to specify different abort operations. One of the values specifies that a task tail abort is to be performed. A task tail abort, in one embodiment, means that the memory system 100 is to abort (if possible) the task having the task ID specified in task ID field 44, along with tasks in the command queue 32 having a task ID higher than the task ID specified in task ID field 44. However, any tasks in the command queue 32 having a task ID lower than the task ID specified in task ID field 44 are not to be aborted. This is what is meant by aborting the tail end of the command queue 32.

The operation code field 46 could be set to other values for other abort operations, in one embodiment. In one embodiment, the operation code field 46 could be set to a value to abort only the task having the task ID in task ID field 44. In one embodiment, the operation code field 46 could be set to a value to abort all tasks on the command queue 32.

In one embodiment, the structure 40 is compliant with a CMD43 in the Secure Digital (SD) Specification. Thus, the command index 42 may be a CMD43 in the Secure Digital (SD) Specification. The task ID field 44 may be, for example, bits [20:16]. The operation code field 46 may be, for example, bits [3:0]. As one example, the operation code field 46 could be set to "0011" to indicate a task tail abort. However, a different value could be used for the operation code field 46 to indicate a task tail abort. Note that task tail abort does not exist in a present version of the Secure Digital (SD) Specification.

Figure 2B:
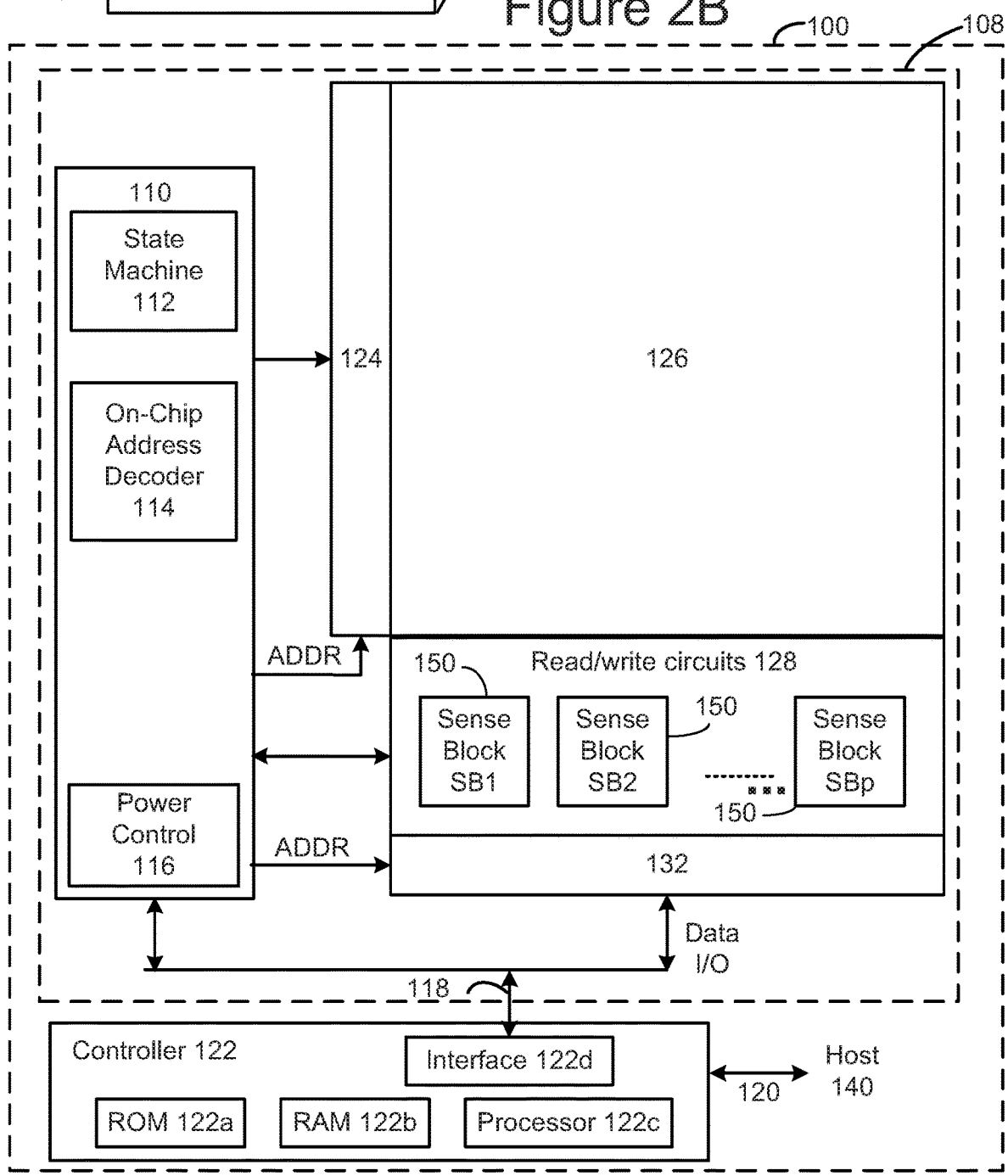
FIG. 2B is a functional block diagram of an example memory device such as the 3D stacked non-volatile memory device of FIG. 2A.
Figure 2C:
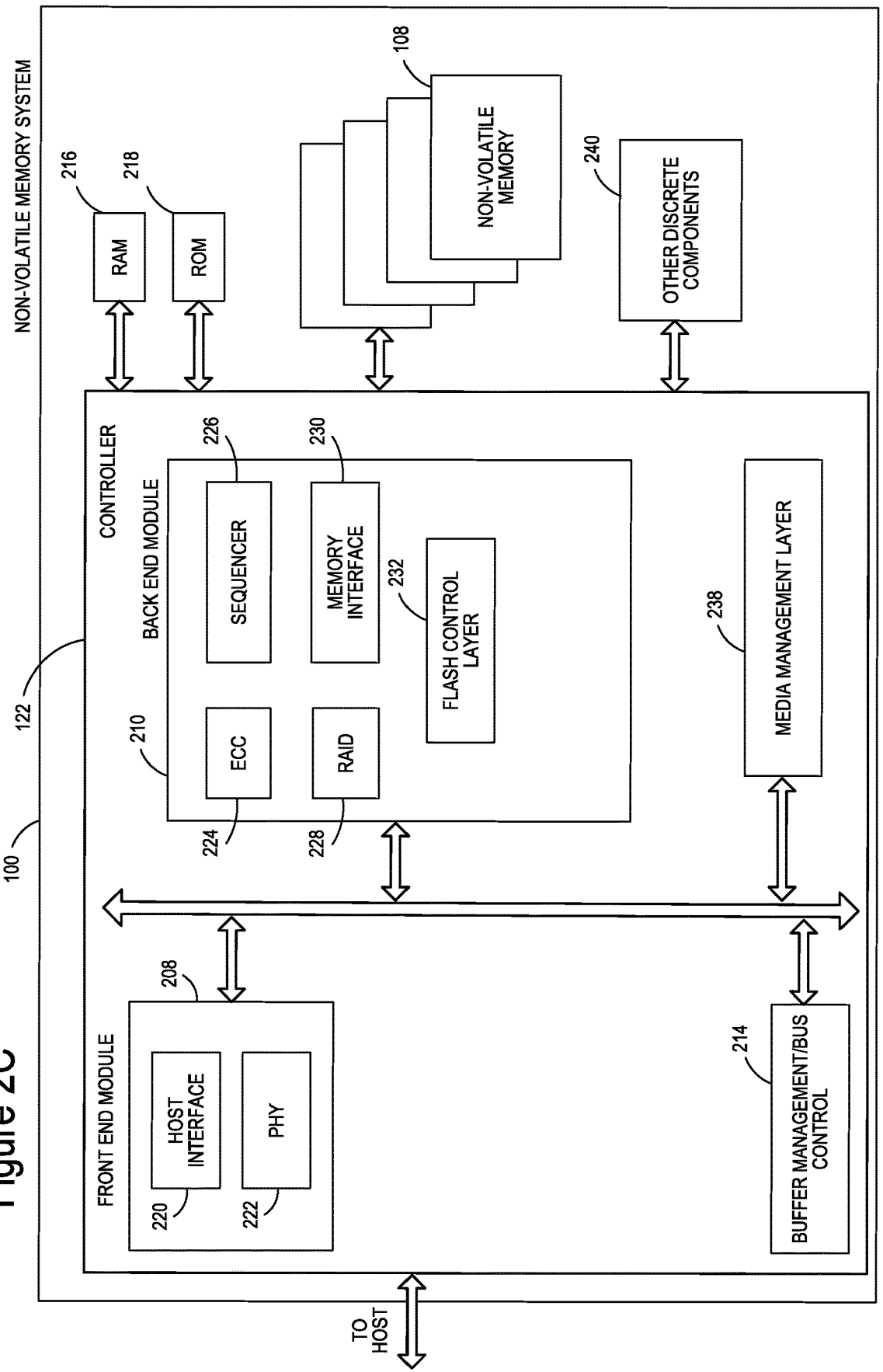
FIG. 2C is a block diagram of example memory system, depicting more details of one embodiment of controller.

FIGS. 2A-2C describe one example of a memory system 100 that can be used to implement the technology proposed herein. FIG. 2A is a perspective view of a three dimensional (3D) stacked non-volatile memory device. The memory system 100 includes a substrate 101. On and above the substrate are example blocks BLK0 and BLK1 of memory cells (non-volatile storage elements). Also on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

FIG. 2B is a functional block diagram of an example memory device such as the 3D stacked non-volatile memory system 100 of FIG. 2A. The components depicted in FIG. 2B are electrical circuits. Memory device 100 includes one or more memory die 108. Each memory die 108 includes a three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. In some systems, a controller 122 is included in the same memory system 100 (e.g., a removable storage card) as the one or more memory die 108. However, in other systems, the controller can be separated from the memory die 108. In some embodiments, controller 122 will be on a different die than memory die 108. In some embodiments, one controller 122 will communicate with multiple memory die 108. In other embodiments, each memory die 108 has its own controller. Commands and data are transferred between the host 140 and controller 122 via a data bus 120, and between controller 122 and the one or more memory die 108 via lines 118. In one embodiment, memory die 108 includes a set of input and/or output (I/O) pins that connect to lines 118.

Memory structure 126 may comprise one or more arrays of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate. In one embodiment, memory structure 126 implements three dimensional NAND flash memory. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters.

The on-chip address decoder 114 provides an address interface between addresses used by host 140 or controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, power control module 116, sense blocks 150, read/write circuits 128, controller 122, processor 122c, and/or interface 122d can be considered one or more control circuits that performs the functions described herein.

The (on-chip or off-chip) controller 122 (which in one embodiment is an electrical circuit) may comprise one or more processors 122c, ROM 122a, RAM 122b, Memory Interface 122d, all of which are interconnected. Other embodiments can use state machines or other custom circuits designed to perform one or more functions. The storage devices (ROM 122a, RAM 122b) comprises code such as a set of instructions, and the processor 122c is operable to execute the set of instructions to provide at least some of the functionality described herein. Alternatively or additionally, processor 122c can access code from a storage device in the memory structure, such as a reserved area of memory cells connected to one or more word lines. Memory interface 122d, in communication with ROM 122a, RAM 122b and processor 122c, is an electrical circuit (electrical interface) that provides an electrical interface between controller 122 and one or more memory die 108. For example, memory interface 122*d* can change the format or timing of signals, provide a buffer, isolate from surges, latch I/O, etc. Processor 122*c* can issue commands to control circuitry 110 (or any other component of memory die 108) via Memory Interface 122*d*.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

FIG. 2C is a block diagram of example memory system 100, depicting more details of one embodiment of controller 122. In this embodiment, the controller is a flash controller; however, the controller is not limited to being a flash controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between controller 122 and non-volatile memory die 108 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host. In other example, memory system 100 can be in the form of a solid state drive (SSD) drive.

In some embodiments, non-volatile memory system 100 includes a single channel between controller 122 and non-volatile memory die 108, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2C, controller 122 includes a front end module 208 that interfaces with a host, a back end module 210 that interfaces with the one or more non-volatile memory die 108, and various other modules that perform functions which will now be described in detail.

The components of controller 122 depicted in FIG. 2C may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for controller 122 to perform the functions described herein. The architecture depicted in FIG.

2C is one example implementation that may (or may not) use the components of controller 122 depicted in FIG. 1A or 2B (e.g., RAM, ROM, processor, interface).

Referring again to modules of the controller 122, a buffer manager/bus control 214 manages buffers in random access memory (RAM) 216 and controls the internal bus arbitration of controller 122. A read only memory (ROM) 218 stores system boot code. Although illustrated in FIG. 2C as located separately from the controller 122, in other embodiments one or both of the RAM 216 and ROM 218 may be located within the controller. In yet other embodiments, portions of RAM and ROM may be located both within the controller 122 and outside the controller. Further, in some implementations, the controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, Secure Digital (SD), Multimedia Card (MMC), embedded Multimedia Card (eMMC), Universal Flash Storage (UFS), Universal Serial Bus (USB) storage device, Serial Advanced Technology Attachment (SATA) and Small Computer Systems Interface (SCSI) interfaces. The host interface 220 typically facilitates transfer for data, control signals, and timing signals.

Back end module 210 includes an error correction code (ECC) engine 224 that encodes the data bytes received from the host, and decodes and error corrects the data bytes read from the non-volatile memory. A command sequencer 226 generates command sequences, such as read, program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of system 100 illustrated in FIG. 2C include media management layer 238, which performs wear leveling of memory cells of non-volatile memory die 108. System 100 also includes other discrete components 240, such as external electrical interfaces, external RAM, resistors, capacitors, or other components that may interface with controller 122. In alternative embodiments, one or more of the physical layer interface 222, RAID module 228, media management layer 238 and buffer management/bus controller 214 are optional components that are not necessary in the controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the flash memory 126 of die 108. The MML 238 may be needed because: 1) the flash memory may have limited endurance; 2) the flash memory 126 may only be written in multiples of ECC pages; and/or 3) the flash memory 126 may not be written unless it is erased as a block. The MML 238 understands these potential limitations of the flash memory 126 which may not be visible to the host. Accordingly, the MML 238 attempts to translate the writes from host into writes into the flash memory 126. As described below, erratic bits may be identified and recorded using the MML 238. This recording of erratic bits can be used for evaluating the health of blocks and/or word lines (the memory cells on the word lines).

Controller 122 may interface with one or more memory dies 108. In one embodiment, controller 122 and multiple memory dies (together comprising non-volatile storage system 100) implement a solid state drive (SSD), which can emulate, replace or be used instead of a hard disk drive inside a host, as a NAS device, laptop, tablet, etc. Additionally, the SSD need not be made to work as a hard drive.

Figure 3:
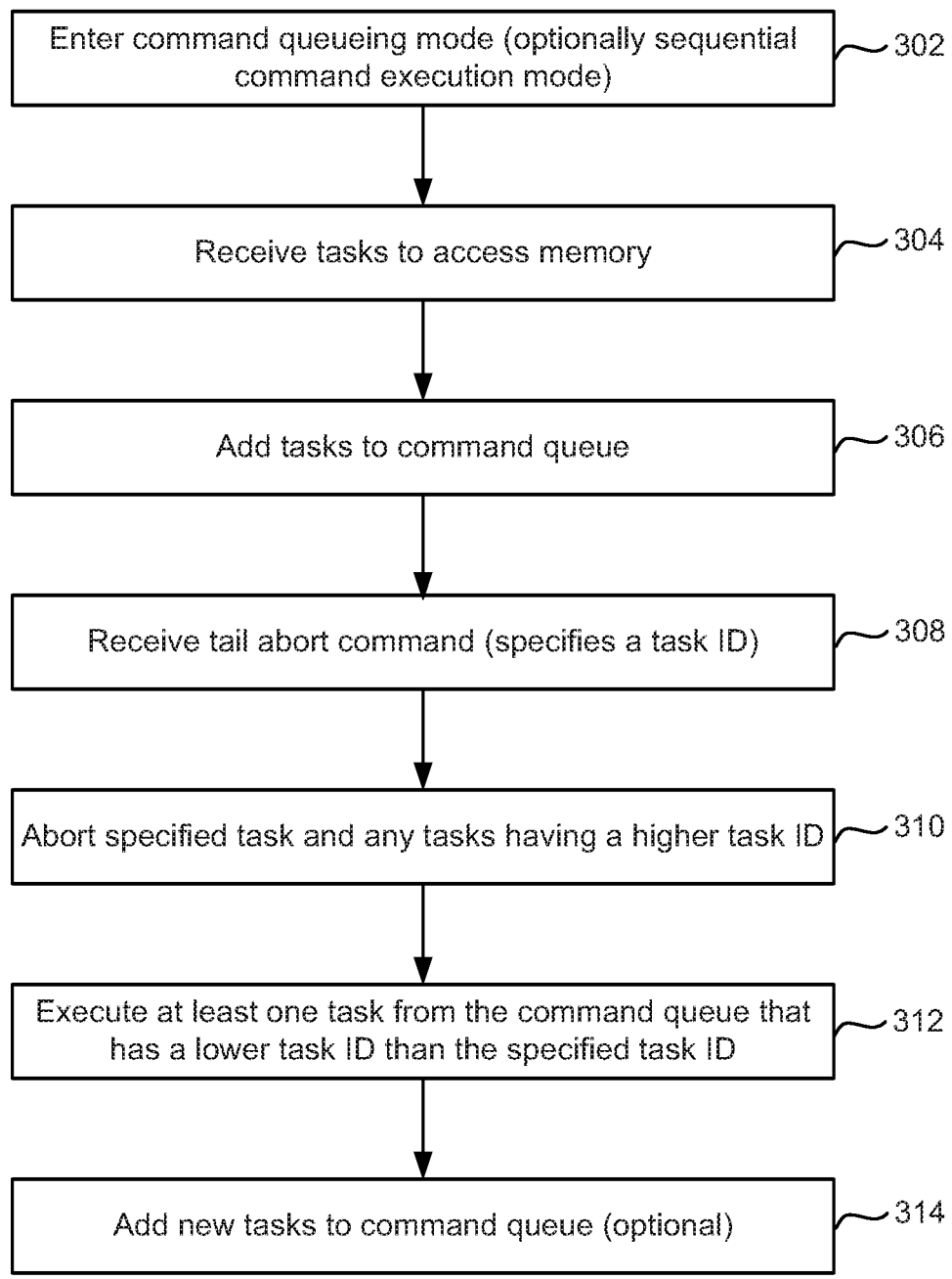
FIG. 3 is a flowchart of one embodiment of a process of operating non-volatile storage.

FIG. 3 is a flowchart of one embodiment of a process 300 of operating non-volatile storage. More particularly, the process 300 may be used to abort a tail portion of a command queue 32 in memory system 100. The process 300 may be performed by the memory controller 122. The process 300 may be performed in a memory system 100 such as those in FIG. 1A, 2A, 2B, and 2C, but is not limited thereto. The steps are described in the depicted order to facilitate explanation, but are not required to be performed in that order.

Step 302 includes the memory system 100 entering a command queueing mode. In the command queueing mode, the memory system 100 adds tasks received from the host 140 onto task command queue 32, in one embodiment. In one embodiment, the command queueing mode is a Command Queue Mode of an SD Specification. The command queueing mode is not required to be a Command Queue Mode of an SD Specification (such as SD Specification 6.0). Thus, the command queueing mode could be for another specification for accessing non-volatile storage. In one embodiment, the host 140 causes the memory system 100 to enter the command queueing mode by setting one or more registers in the performance registers 36.

In one embodiment of step 302, the memory system 100 enters a sequential command execution mode. When in the sequential command execution mode, the memory system 100 executes tasks in order of task identifiers, in one embodiment. In one embodiment, the sequential command execution mode is a Sequential CQ Mode of an SD Specification (such as SD Specification 6.0). Note that the sequential command execution mode is optional. In one embodiment, the memory system 100 is not in a sequential command execution mode during process 300. For example, in one embodiment, the memory system 100 is in a voluntary command execution mode during process 300. For example, the memory system 100 could be in a Voluntary CQ Mode of an SD Specification (such as SD Specification 6.0).

In one embodiment, the memory system 100 enters the sequential command execution mode in response to the host 140 initiating the sequential command execution mode. In one embodiment, the host 140 writes to one or more of the performance registers 36 to cause the memory system 100 to enter the sequential command execution mode. However, another technique could be used to enter the sequential command execution mode.

Step 304 includes the memory system 100 receiving tasks from the host 140 to access non-volatile memory (e.g., memory structure 126). Each of the tasks has a task identifier. Each task can include one or more command. For example, the host 140 might send a task set command (e.g., CMD44) and a task address command (e.g., CMD45) for each of the tasks. In one embodiment, the host 140 submits tasks to the memory system 100 as shown and described with respect to FIG. 5.

Step 306 includes adding the tasks to a command queue 32. For example, the memory controller 122 may decode a task set command (e.g., CMD44) and a task address command (e.g., CMD45) and add information from decoding the commands to a task command register 32(0)-32(n-1) for that task.

Figure 4A:
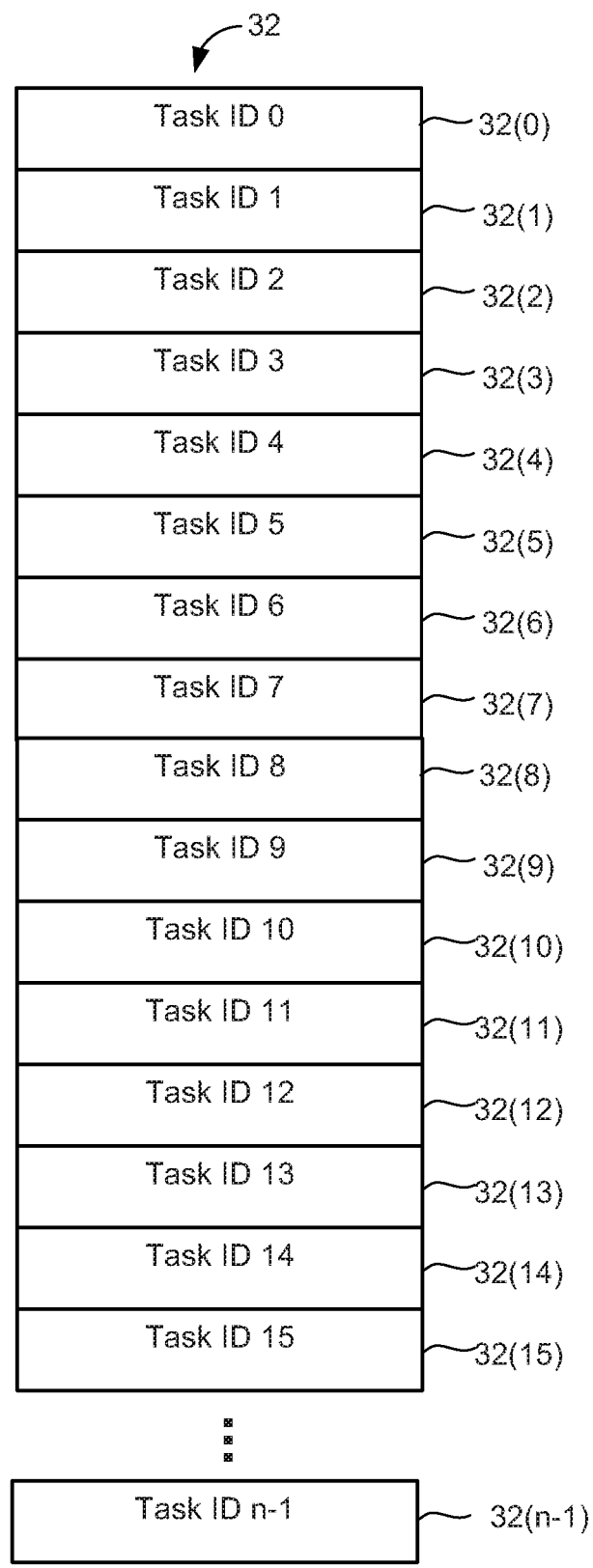
FIG. 4A depicts results after one embodiment of step 306 of the process of FIG. 3.

FIG. 4A depicts results after one embodiment of step 306. The command queue 32 has been filled with "n" tasks, in this example. More specifically, each task register 32(0) to 32(n-1) has one task. In this example, the tasks have task IDs 0 to n-1. In this example, task register 32(0) is the head of the command queue 32 and task register 32(n-1) is the tail of the command queue 32. Note that the command queue 32 will not always be full after step 306.

Step 308 includes the memory system 100 receiving a tail about command from the host 140. The tail about command specifies a task identifier. In one embodiment, the host 140 sends the structure 40 depicted in FIG. 1D. Moreover, the host 140 may fill the task ID field 44 with the task identifier that specifies the tail end of the command queue 32. In other words, the host 140 may specify the lowest task ID that is to be aborted. The host 140 may also fill the operation code field 46 to indicate that this is a task tail abort command, such that all tasks having a task ID higher than the value in the task identifier field 44 are also aborted. However, tasks having a task ID lower than the value in the task identifier field 44 are not to be aborted.

Step 310 includes the memory system 100 aborting the task with the specified task ID and any tasks having a higher task ID than the specified task ID. In other words, the memory system executes the task abort command. Step 310 aborts the tail end of the command queue 32, in one embodiment.

Figure 4B:
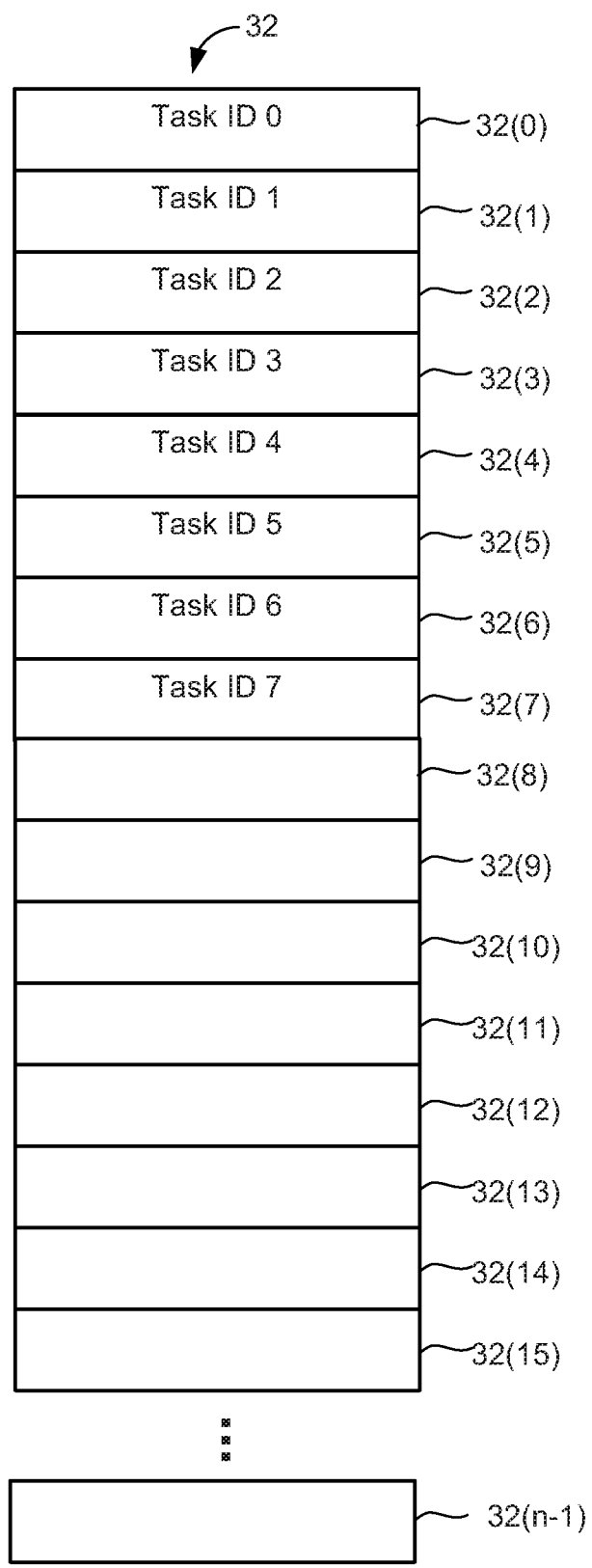
FIG. 4B depicts results after one embodiment of step 310 of the process of FIG. 3.

FIG. 4B depicts results after one embodiment of step 310. In this example, the tail about command specified task ID 8. Thus, task ID 8 has been removed from task register 32(8). Also, all tasks having a task ID higher than 8 (e.g., 9 to n-1) have been removed from their respective task registers (e.g., 32(9) to 32(n-1)). However, the tasks having a task ID lower than 8 (e.g., 0 to 7) have been left in their respective task registers (e.g., 32(0) to 32(7)). Therefore, the host 140 need not re-send any of those tasks to the memory system 100. Hence, the head of the command queue 32 need not be re-built, which saves considerable time. Note that that the tail end of the task command queue 32, starts at the task ID specified in the task tail abort command and includes all tasks having a higher task ID. Thus, in this example, the tail end of the task command queue 32 starts at task ID 8 (in task register 32(8)) and goes until task ID n-1 (in task register 32(n-1)).

Step 312 is to execute at least one task having a lower task ID than the task ID specified in the task tail abort command. Note that step 312 occurs after receiving the task tail abort command. Also, the task that is executed in step 312 is a task that was already on the command queue 32 when the task tail abort command was received. Thus, the task is one that was waiting to be executed when the task tail abort command was received. With reference to example of FIG. 4B, at least one of tasks having a task ID 0 to 7 is executed. By executing the task, it is meant that either data from the host 140 is written to the non-volatile storage (e.g., structure 126) or data is read from non-volatile storage (e.g., structure 126) and provided to host 140. For example, a read or write command may be performed to access structure 126.

Figure 4C:
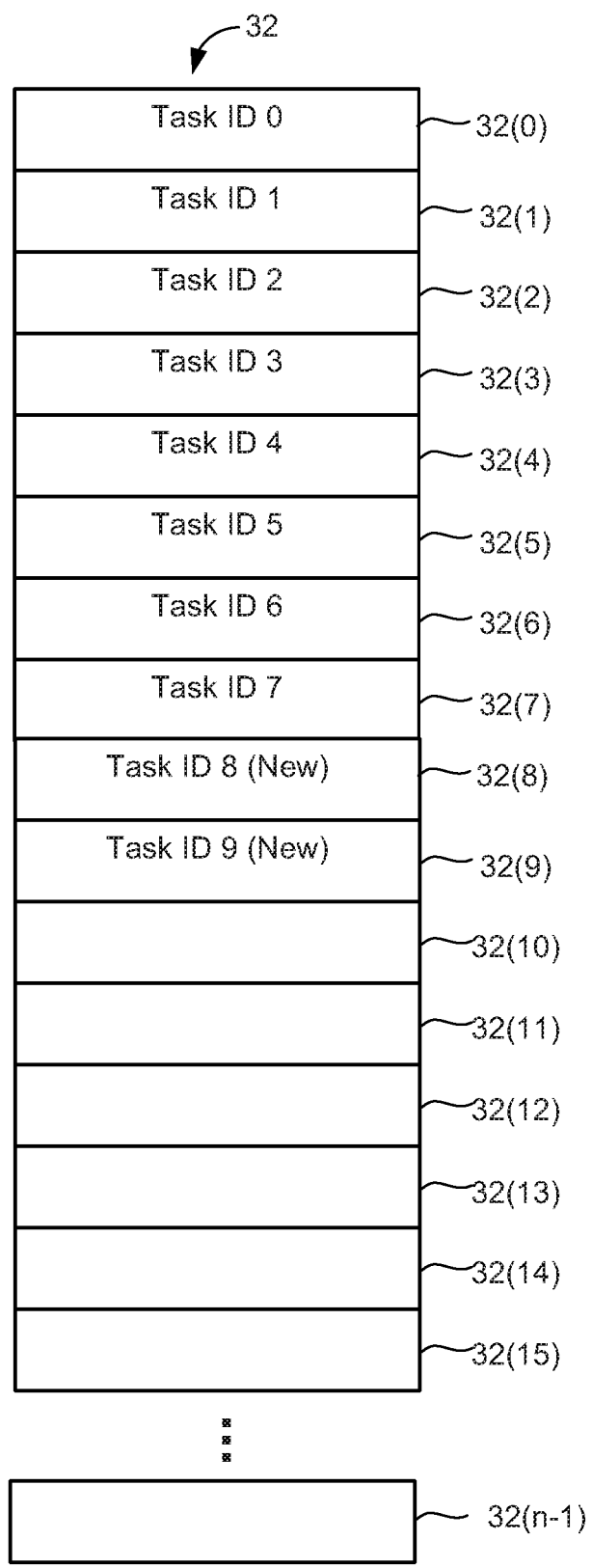
FIG. 4C depicts results after one embodiment of step 314 of the process of FIG. 3.

Step 314 is to optionally add new tasks to the command queue 32. Step 314 may include the host 140 sending one or more new tasks having task IDs starting at the tail end of the command queue 32. FIG. 4C depicts results after one embodiment of step 314. A new task having task ID 8 (as well as a new task having task ID 9) have been added to the command queue 32. Note, however, that the host 140 did not need to re-send the tasks having the lower task IDs (e.g., task IDs 0 to 7). Thus, considerable time may be saved by not needing to re-build the head end of the command queue 32.

FIG. 5 depicts one example of information flow between a host and a memory device when processing tasks. This information flow may take place during one embodiment of process 300. The host 140 and memory system 100 referred to in FIG. 5 may the host 140 and memory system 100 in any of FIG. 1A, 2B or 2C, but are not limited to those examples.

At step 502, the host 140 sends information to the memory system 100 to cause the memory system 100 to enter a command queuing mode. Optionally, the host 140 sends information to cause the memory system 100 to enter a sequential command execution mode. Note that in one embodiment, the host does not cause the memory system 100 to enter a sequential command execution mode. In one embodiment, the host may send information to cause the memory system 100 to be in a voluntary command execution mode.

Steps 504-514 depict a task submission phase. In this example, the host submits 16 tasks (e.g., Task 0 to Task 15). The submission of each task includes a task set command and a task information command, in this example.

At step 506, the host 140 sends a task set command for a task having task ID=0 to the memory system 100. In this example, the task set command identifies this as a read task. Optionally, the task set command could indicate a data length. The data length, if provided, may be expressed in a pre-defined unit, such as a sector or block. For example, a sector could be defined as 512 Bytes, and a block might be defined as 4 kilo-bytes (kB). The memory system 100 may send a response message to the host 140 acknowledging that it has received the task set command. The response message is not depicted in FIG. 5, so as to not clutter the diagram. In one embodiment, the task set command is CMD44 in the Secure Digital (SD) 6.0 specification; however, the task set command is not limited to an SD specification. Note that in response to receiving the task set command, the memory system 100 may decode the task set command and add information to one of the task command registers 32(0)-32(n-1). For the sake of example, the information is added to task command register 32(0).

At step 506, the host 140 sends a task address command for the task having task ID=0 to the memory system 100. The task address command may include a start address, which indicate the start address of data corresponding to the current task. The start address may be logical address. The task address command may also include a data length, if that information is not included in the task set command. One example of a task address command is CMD45 in the Secure Digital (SD) 6.0 specification; however, the task address command is not limited to an SD specification. Note that in response to receiving the task address command, the memory system 100 may decode the task address command and add information to the appropriate task register for the task with that ID. For the sake of example, the information is added to task command register 32(0).

At step 508, the host 140 sends a task set command for another task to the memory system 100. The task set command contains a task ID, in one embodiment. In this example, the task set command identifies this as a write task for task having an ID=1. Optionally, the task set command could indicate a data length. In one embodiment, the task set command is CMD44 in the Secure Digital (SD) 6.0 specification; however, the task set command is not limited to an SD specification. Note that in response to receiving the task set command, the memory system 100 may decode the task set command and add information to one of the task command registers 32(0)-32(n−1). For the sake of example, the information is added to task command registers 32(1).

At step 510, the host 140 sends a task address command to the memory system 100. This task address has the same task ID as the write task in step 508. The task address command may include a start address, which indicate the start address of data corresponding to the current task. One example of a task set address is CMD45 in the Secure Digital (SD) 6.0 specification; however, the task set address is not limited to an SD specification. Note that in response to receiving the task address command, the memory system 100 may decode the task address command and add information to the appropriate task register for the task with that ID. For the sake of example, the information is added to task command registers 32(1).

The host may continue to send more tasks to the memory system. Steps 512-514 refer to a task having a task ID=15. Note that tasks having task IDs between 2 and 14 are not depicted so as to simplify the diagram. Note that steps 504-514 may correspond to one embodiment of steps 304-306.

Step 516 includes the host 140 sending a task tail abort command to the memory system 100. The task tail abort command specifies the task having task ID=8, in this example. Note that step 516 may correspond to one embodiment of step 308.

After the memory system 100 executes the task tail abort command, the memory system sends a task tail abort success message to the host 140, in step 518. The host 140 may then clear the aborted tasks from a queue that it maintains, in one embodiment.

In the event that the task tail abort command cannot be executed in whole or in part, the memory system 100 may send a task tail abort fail message (not depicted in FIG. 5) to the host 140.

Step 520 includes the host 140 sending a command to the memory system 100 to execute task 0. In one embodiment, the host sends a CMD46 in the Secure Digital (SD) 6.0 specification; however, the execute command is not limited to an SD specification. Note that the host 140 does not check whether task 0 is ready to execute prior to sending the execute command, in one embodiment. Another option is for the host 140 to first check that task 0 is ready to execute prior to sending the execute command. Note that the memory system 100 may place information into the task status register 30 to indicate whether a task is ready to execute.

At step 522, the data for Task 0 is transferred from the memory system 100 to the host.

In the example of FIG. 5, the task tail abort command was sent in step 516 prior to execution of any of the tasks on the command queue 32. However, note that one or more of the tasks on the command queue 32 could be executed prior to the host 140 sending the task tail abort command. In one embodiment, the tasks are executed in order of their task IDs (e.g., in the sequential command execution mode).

Also note that in the example of FIG. 5, the memory system 100 does not execute a task until it receives an execute command from the host (see, e.g., step 520). This allows the host 140 to be sure that the task tail abort command can be sent prior to execution of the tasks to be aborted, in one embodiment. However, note that in one embodiment, the memory system 100 is not required to wait for an execute command for a specified task from the host 140 in order to execute the specified task.

As mentioned above, the task tail abort command allows considerable time to be saved by, for example, the host 140 not needing to re-send tasks to be queued again. The following example will be used to describe possible time savings for a case having 32 tasks. With reference to the example of FIG. 5, the submission of each task can be measured in host clock cycles. In some cases, each of the commands could consume up to 178 clock cycles. This factors in 48 clock cycles for the host to send the command, 48 clock cycles for the memory system to send the response, plus up to 82 clock cycles for various delays between the sending of the command and response. Each task may have a task set command (with response) and a task address command (with response), in one example. Thus, each task could take up to 356 clock cycles, in one example.

Consider the time if the host 140 were to abort the $32^{nd}$ task by aborting all tasks on the command queue 32. Then, the host re-builds the entire queue (with a new task to replace the aborted $32^{nd}$ task). Given an assumption of 356 clock cycles per task, this totals 11,392 clock cycles to re-build the command queue 32. In contrast, using the task tail abort command, only the $32^{nd}$ task needs to be removed from the command queue 32. The first 31 tasks may be left on the command queue 32. This means that at most 356 clock cycles (in the present assumptions) need to be used to replace the $32^{nd}$ task on the command queue 32. Thus, a time savings of 11,392−256=11,036 clock cycles may be possible in the present example. The time savings may be lower if the task tail abort command is used to abort more than one task on the command queue 32. The actual time savings may also differ depending on, for example, the number of clock cycles needed to submit each task for the protocol being used.

Figure 6:
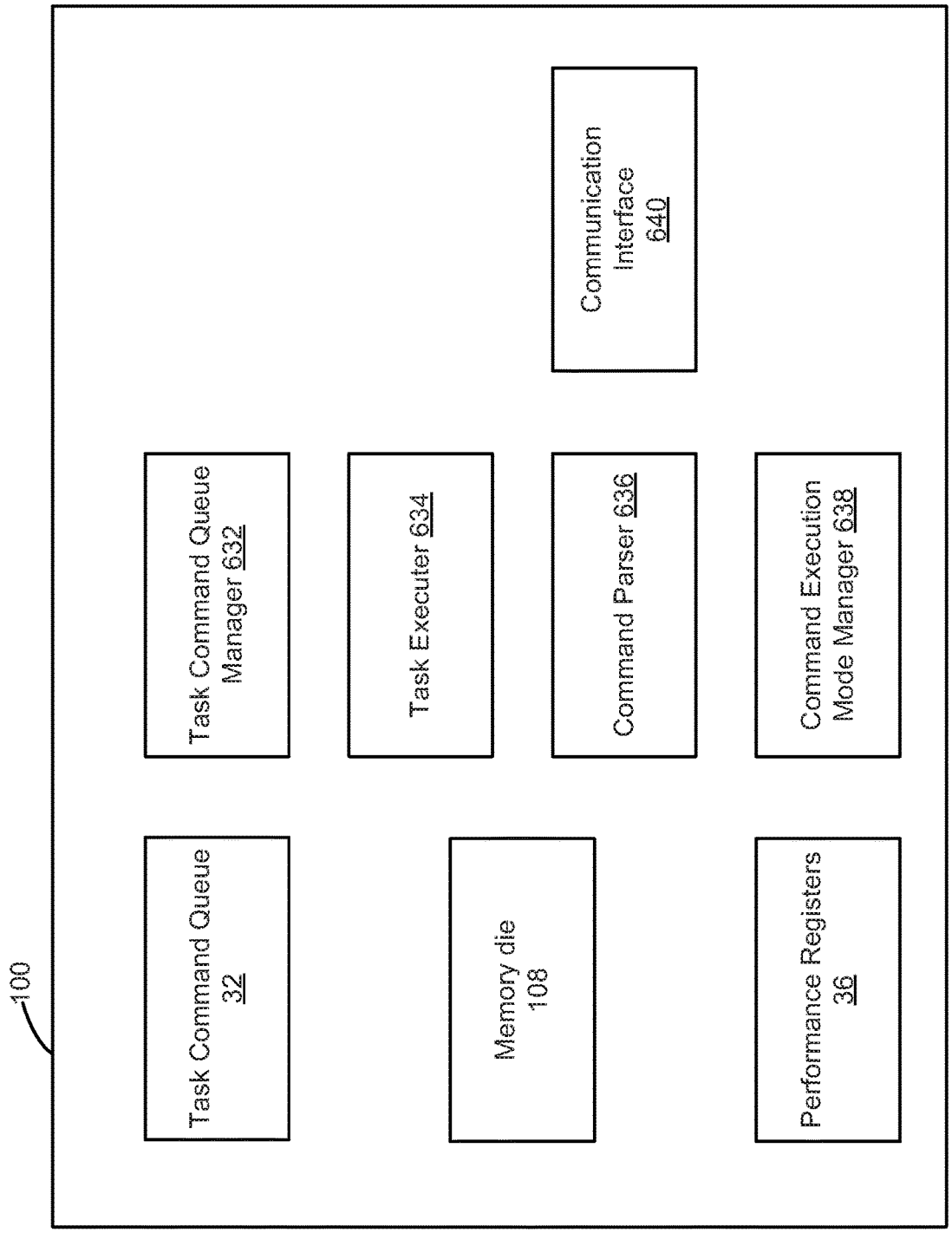
FIG. 6 is a block diagram of one embodiment of a memory system.

FIG. 6 is a block diagram of one embodiment of a memory system 100. The memory system 100 is one embodiment of the memory systems in FIGS. 1A, 2A, 2B, and 2C. The memory system 100 has a memory die 108, task command queue 32, and performance registers 36, which have been described already with respect to FIGS. 1A and 1C. The memory system 100 also has a task command queue manager 632, task executer 634, command parser 636, a command execution mode manager 638, and a communication interface 640.

The communication interface 640 is configured to receive tasks and associated commands from the host 140. The communication interface 640 is also configured to send responses to the commands to the host 140. The communication interface 640 is implemented by front end module (see FIG. 2C, 208), in one embodiment. In one embodiment, the communication interface 640 receives the tasks in step 304 of process 300. In one embodiment, the communication interface 640 receives the task tail abort command in step 308 of process 300. In one embodiment, the communication interface 640 receives the various commands from the host 140 in FIG. 5. The communication interface 640 may also be used to provide data to the host, as in step 522 of FIG. 5.

Figure 8:
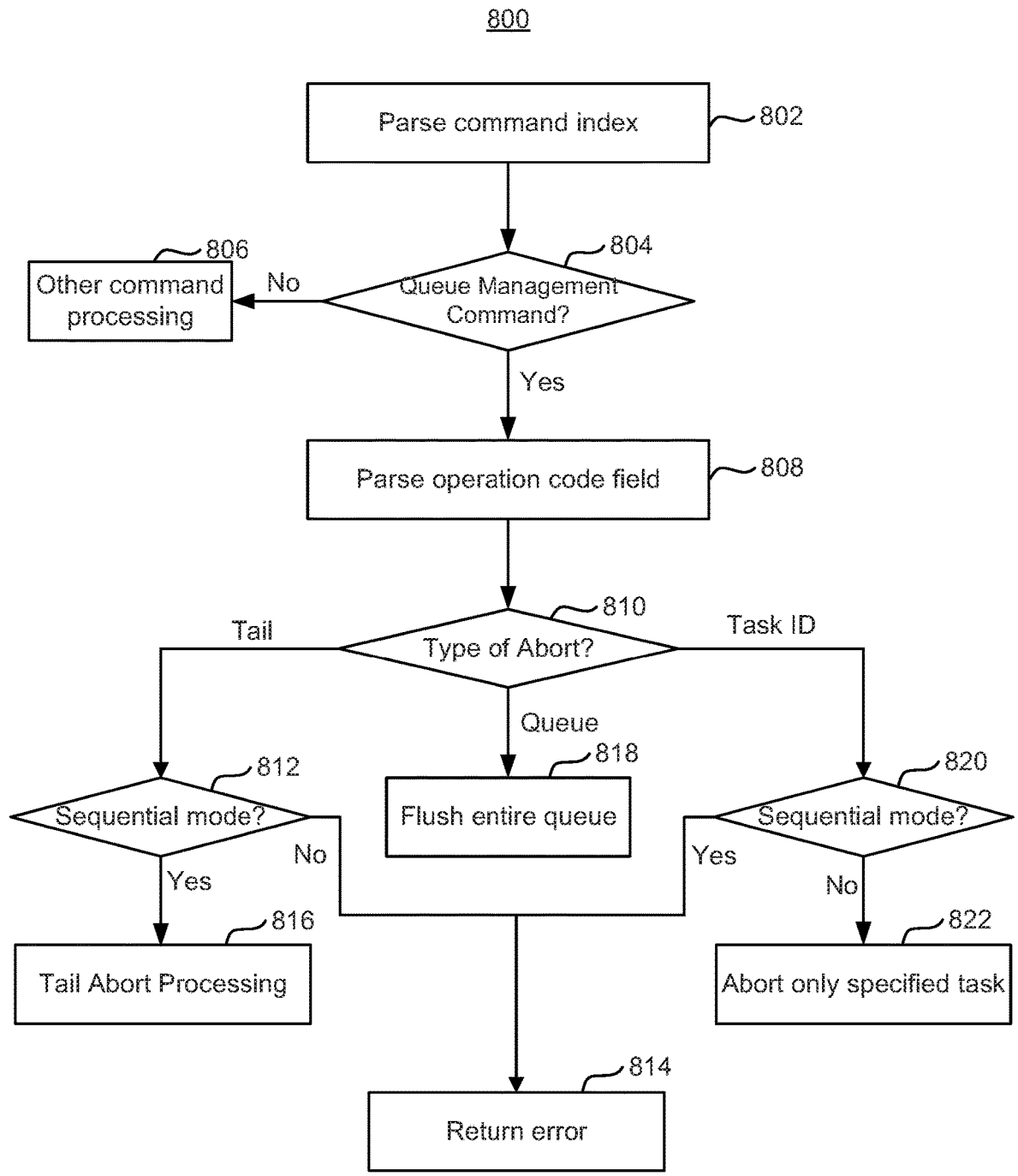
FIG. 8 is a flowchart of one embodiment of a process of parsing commands received from a host.

The command parser 636 is configured to parse commands received on the communication interface 640. These commands could include memory access commands, such as read or write commands. These commands could include management function commands, such as a task tail abort command. In one embodiment, the command parser 636 parses commands for the tasks received in step 304 of process 300. In one embodiment, the command parser 636 parses the task tail abort command received in step 308 of process 300. FIG. 8 shows a flowchart of one embodiment of parsing a command from a host 140, which may be performed by the command parser 636.

The command execution mode manager 638 is configured to establish a command execution mode to execute the tasks. The modes could include, but are not limited to, a command queuing mode, a sequential mode, and a voluntary mode. Note the some of these mode may be sub-modes. For example, the sequential mode and the voluntary mode can be two possible sub-modes of a command queuing mode. In one embodiment, the command execution mode manager 638 reads values in the performance registers 36, which were set by host 140, in order to determine what command execution mode to establish. In one embodiment, the command execution mode manager 638 causes the memory system 100 to enter the command queuing mode (and possibly sequential execution mode) in step 302 of process 300.

The task command queue manager 632 is configured to add tasks to the task command queue 32. The task command queue manager 632 is configured to remove tasks from the task command queue 32 in response to a task tail abort command. Adding a task to the command queue 32 includes storing information in non-transitory storage (such as a register 32 or volatile memory 122b). Removing a task from the command queue 32 may include deleting the information from the non-transitory storage, or at least storing a marker that indicates that the information is no longer valid. For example, a flag could be set in a register 32 to indicate that the present entry is not valid in order to remove a task from that register.

In one embodiment, task command queue manager 632 adds tasks to the command queue in step 306 of process 300. In one embodiment, task command queue manager 632 removes the task having the specified task ID and any tasks on the queue 32 having a task ID greater than the specified task ID from the command queue 32 in step 310 of process 300. In one embodiment, the task command queue manager 632 adds new tasks to the command queue in step 314 of process 300.

The task executer 634 is configured to execute tasks that are on the task command queue 32. The task executer 634 executes the tasks in accordance with the present command execution mode, in one embodiment. For example, in one embodiment of the sequential mode, the task executer 634 executes the tasks on the task command queue 32 in order of the task IDs. Note that this sequential execution may be in response to execute commands from the host 140. However, in one embodiment of the voluntary mode, the task executer 634 may execute the tasks on the task command queue 32 out of the order of the task IDs. In one embodiment, the task executer 634 executes the at least one task in step 312 of process 300.

The task command queue manager 632, task executer 634, command parser 636, command execution mode manager 638, and communication interface 640 may be implemented in hardware, software, or some combination of hardware and software. The task command queue manager 632, task executer 634, command parser 636, command execution mode manager 638, and communication interface 640 may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module (e.g., command queue manager 632, task executer 634, command parser 636, command execution mode manager 638, and communication interface 640) may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor (such as processor 122c in FIG. 1A, 2B or 2C) to perform the functions described herein.

Figure 7:
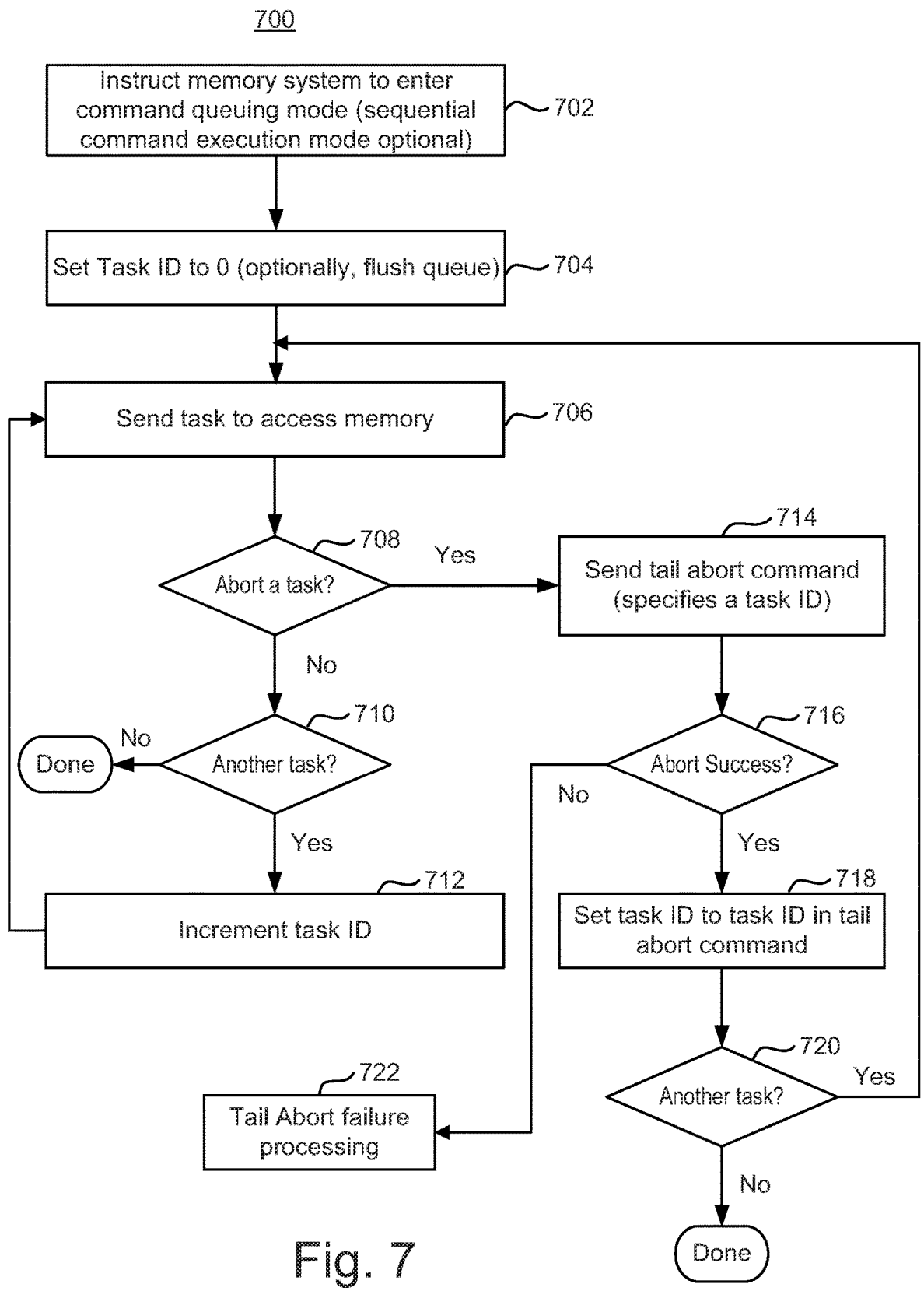
FIG. 7 is a flowchart of one embodiment of a process of a host sending tasks and a tail task abort command to a memory system.

FIG. 7 is a flowchart of one embodiment of a process 700 of a host 140 sending tasks and a tail task abort command to a memory system 100. The process 700 may be performed by, for example, host 140 in FIG. 1A. For example, host processor 10 may perform process 700.

Step 702 includes the host 140 instructing the memory system 100 to enter a command queuing mode. Optionally, the host 140 instructs the memory system 100 to enter a sequential command execution mode. Note that the sequential command execution mode is optional. In one embodiment, the host 140 does not instruct the memory system 100 to be in a sequential command execution mode during process 700. For example, in one embodiment, the host 140 may instruct the memory system 100 to enter a voluntary command execution mode during process 700.

Step 704 includes setting the task ID to 0. In one embodiment, the task ID is not set to 0. In some embodiments, the command queue 32 should be cleared prior to sending tasks to the memory system 100 in process 700. Thus, optionally, the host 140 may send a command to the memory system 100 to flush the entire command queue 32 prior to step 706. An example of such a command to flush the entire queue is discussed in step 814 of process 800.

Step 706 is for the host 140 to send a task to access memory to the memory system 100. An example of this has been shown and described with respect to the host sending a task set command and a task address command in, for example, step 504 and 506 of FIG. 5. Note that the memory system 100 may add this task to the command queue 32, as described herein.

Step 708 is a determination by the host 140 as to whether a task is to be aborted. Prior to describing aborting a task, the path of not aborting (step 708=no) will be discussed. Step 710 is performed in the event a task is not going to be aborted.

Step 710 includes determining whether another task is to be sent to the memory system (to be added to the queue 32). If not, then the process 700 concludes. Otherwise, the task ID is incremented in step 712. Note that in some embodiments, the host 140 will only send a limited number of tasks to the memory system 100 to be added to the task command queue 32. For example, the task command queue 32 may have a depth of 32 tasks. In this case, the task ID cannot be incremented past the queue depth. After step 712, the process 700 returns to step 706 to send the next task to the memory system 100.

Next, the path in which a task is aborted will be discussed. The host 140 may decide to abort a task at step 708. In this case, the host 140 sends a task tail abort command to the memory system 100 in step 714. The task tail abort command specifies the task ID of the task to be aborted. This may be any task that the host 140 has sent to the memory system in process 700. As discussed herein, the memory system 100 will respond to the task tail abort command by aborting the task having the specified ID and any tasks on the task command queue having a task ID greater than the specified task ID.

Step 716 is a determination, by the host 140, whether the task tail abort was successful. Step 716 may include determining whether the memory system 100 sends back a task tail abort success, such as in step 518 of FIG. 5.

If the task tail abort was successful, then the host may set the task ID to the task ID that was specified in the task tail abort command, in step 718. This means that the task ID may be reduced. For example, the task ID may have been set to 15 (assuming that tasks 0 to 15 were sent to the memory system 100). The host might set the task ID to, for example, 8 if the task ID in the task tail abort command was 8.

Step 720 includes a determination by the host 140 of whether another task is to be sent to the memory system 100 (to be added to the task command queue 32). If so, then the process 700 returns to step 706. Note that at this point in time, the portion of the task command queue 32 having task IDs less than that specified in the task tail abort command may still be intact. Hence, the host 140 need not rebuild the entire task command queue 32.

Returning to the discussion of step 716, if the task tail abort command was not successful, then task tail abort failure processing is performed in step 722. The process may depend on the nature of the failure. The failure could be a total failure or a partial failure, in one embodiment. For example, the memory system 100 may have been able to abort some, but not all, of the tasks that were to be aborted. As one example, if the failure is due to the memory system 100 not being able to abort one or more of the tasks at the tail end of the command queue 32, then the memory system 100 might specify which tasks were aborted and which were not. In this case, the host may proceed accordingly. Other possibilities exist for error processing when the task tail abort command fails.

FIG. 8 is a flowchart of one embodiment of a process 800 of parsing commands received from a host 140. The process 800 may be performed in the memory system 100 of FIG. 1A, 2A, 2B, or 2C. Some of the steps of process 800 are performed by the command parser 636, in one embodiment. Reference will be made to the example structure 40 in FIG. 1D; however, process 800 is not limited to that structure 40.

Step 802 includes parsing the command index field 42. For example, the command parser 636 accesses bits in the command index field 42. Step 804 is a determination of whether this is a queue management command. For example, the command parser 636 may compare the bits in the command index field 42 to a bit pattern for a queue management command. In one embodiment, the command parser 636 determines whether this is a queue management command in accordance with an SD Specification (such as SD Specification 6.0). For example, the command parser 636 may determine whether this is a CMD43. Note that the queue management command is not limited to being a CMD43 in the SD Specification. Also, the queue management command is not limited to being a command in the SD Specification.

If the command is not a queue management command (step 804=no), then control passes to step 806. In step 806, processing of another type of command is performed.

If the command is a queue management command (step 804=yes), then control passes to step 808. Step 808 includes parsing an operation code field. For example, the command parser 636 accesses bits in the operation code field 46.

Step 810 is a decision based on the type of abort specified in the operation code field. If the abort is a task tail abort, then control passes to step 812. Step 812 is an optional step to determine whether the memory system 100 is in a sequential command execution mode. In one embodiment, if the memory system 100 is not in a sequential command execution mode, then an error is returned in step 814. However, step 812 is not required. Thus, in one embodiment, the memory system 100 is not required to be in a sequential command execution mode to go on to step 816. For example, the memory system 100 might be in a voluntary command execution mode, in one embodiment.

Step 816 includes task tail abort processing. One embodiment of task tail abort processing includes performing step 310 in process 300. In one embodiment, the command parser 636 parses the task ID field 44 in structure 40 in step 310 to determine the start of the tail of the command queue 32 for the task tail abort operation.

If the abort is a queue, then control passes to step 818. Step 818 includes a total queue abort. In step 818, all of the tasks presently on the command queue 32 are aborted. Thus, in step 818, the task command queue manager 632 may remove all tasks from the task command queue 32.

If the abort is for only a specified task ID, then control passes to step 820. Step 820 is a determination of whether the memory system 100 is in a sequential command execution mode. If the memory system 100 is in the sequential command execution, then control passes to step 814. In step 814, the memory system 100 returns an error to the host 140, in this embodiment. If the memory system 100 is not in the sequential command execution (step 820=no), then control passes to step 822. For example, if the memory system 100 is in a voluntary command execution, then control passes to step 822. Step 822 includes an abort of only the task having the task ID in the queue management command. In one embodiment, the command parser 636 parses the task ID field 44 in structure 40 to determine which task to abort.

A first embodiment disclosed herein is an apparatus comprising: non-volatile memory; a communication interface configured to receive tasks to access the non-volatile memory; and one or more control circuits in communication with the communication interface and the non-volatile memory. Each of the tasks has a task identifier. The one or more control circuits are configured to abort a task having a specified task identifier and all tasks waiting to be executed having a task identifier greater than the specified task identifier in response to receiving a task tail abort command over the communication interface. The task tail abort command has the specified task identifier. The one or more control circuits are configured to execute at least one task having a lower task identifier than the specified task identifier. The at least one task being a task that was waiting to be executed when the task tail abort command was received.

In a second embodiment, in furtherance of the first embodiment, the one or more control circuits are further configured to add the tasks to a command queue in non-transitory storage in the apparatus. The one or more control circuits are further configured remove the task having the specified task identifier and any tasks having a higher task identifier than the specified task identifier from the command queue without executing the task having the specified task identifier and any tasks having a higher task identifier than the specified task identifier.

In a third embodiment, in furtherance of any of the first or second embodiments, the one or more control circuits are further configured to leave any tasks having a task identifier lower than the specified task identifier on the command queue in response to the task tail abort command.

In a fourth embodiment, in furtherance of any of the first to third embodiments, the one or more control circuits are further configured to add a new task having the specified task identifier to the command queue. The new task is added with at least one task having a lower task identifier than the specified task identifier still left on the command queue.

In a fifth embodiment, in furtherance of any of the first to fourth embodiments, the one or more control circuits are further configured to execute the new task along with the at least one task having the lower task identifier than the specified task identifier still left on the command queue in order of the task identifiers.

In a sixth embodiment, in furtherance of any of the first to fifth embodiments, the one or more control circuits are configured to access the non-volatile memory to execute the new task along with the at least one task having the lower task identifier.

In a seventh embodiment, in furtherance of any of the first to sixth embodiments, the task tail abort command is a CMD43 command in a Secure Digital protocol.

In an eighth embodiment, in furtherance of any of the first to seventh embodiments, the one or more control circuits are configured to execute tasks received over the communication interface in order of the task identifiers of the respective tasks when in a sequential command execution mode. The task tail abort command is received while in the sequential command execution mode.

In a ninth embodiment, in furtherance of any of the first to eighth embodiments, the sequential command execution mode is a Sequential CQ mode in a Secure Digital protocol.

One embodiment includes a method of operating a memory system. The method comprises: entering a sequential execution mode in which tasks received at a memory system are executed by the memory system in order of a task identifier of each respective task; placing tasks received at the memory system while in the sequential execution mode onto a command queue in the memory system. Each of the tasks has a task identifier and includes a command to access non-volatile storage in the memory system. The method further includes receiving a task tail abort command at the memory system while in the sequential execution mode. The task tail abort command has a specified task identifier. The method further includes, in response to receiving the task tail abort command while the memory system is in the sequential execution mode, aborting the task having the specified task identifier and all tasks on the command queue having a higher task identifier than the specified task identifier. The method further includes executing at least one task from the command queue after receiving the task tail abort command. The at least one task has a task identifier that is lower than the specified task identifier. The at least one task is on the command queue at the time the task tail abort command is received. Executing the at least one task includes accessing the non-volatile storage.

One embodiment includes a non-volatile memory system, comprising: non-volatile memory; communication interface means for receiving tasks to access the non-volatile memory, each of the tasks having a task identifier. The communication interface means is further for receiving a task tail abort command having a specified task identifier. The non-volatile memory system further includes command execution mode means for entering a sequential execution mode in which the tasks are executed in order of the task identifier of each respective task; command queue management means for placing tasks received by the communication interface means while in the sequential execution mode onto a command queue; and task execution means for executing at least one task from the command queue after receiving the task tail abort command. The at least one task has a task identifier that is lower than the specified task identifier. The at least one task is on the command queue at the time the task tail abort command is received. The command queue management means is further for, in response to receiving the task tail abort command while in the sequential execution mode, aborting the task having the specified task identifier and all tasks on the command queue having a higher task identifier than the specified task identifier.

In one embodiment the communication interface means comprises one or more of data bus 120, front end module 208, host interface 220, a physical layer interface (PHY) 222, controller 122, processor 122*c*, communication interface 640, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the communication interface means may include software stored in a processor readable device (e.g., memory).

In one embodiment the command execution mode means comprises one or more of command execution mode manager 638, processor 122*c*, controller 122, RAM 122*b*, performance registers 36, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the command execution mode means may include software stored in a processor readable device (e.g., memory) to program a processor to enter a sequential execution mode.

In one embodiment the command queue management means comprises one or more of task command queue manager 632, task command queue 32, registers 32(0) to 32(*n*−1), processor 122*c*, controller 122, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the command execution mode means may include software stored in a processor readable device (e.g., memory) to program a processor to perform command queue management.

In one embodiment the task execution means comprises one or more of task executer 634, task command queue 32, registers 32(0) to 32(*n*−1), processor 122*c*, controller 122, control circuitry 110, state machine 112, on-chip address decoder 114, power control 116, read/write circuits 128, sense blocks, decoders 124/132, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the task execution means may include software stored in a processor readable device (e.g., memory) to program a processor to perform task execution.

One embodiment of the non-volatile memory system further comprises command parsing means for parsing the task tail abort command, including means for interpreting whether an operation code field in the task tail abort command indicates the task tail abort command or another type of abort operation. The command parsing means, in one embodiment, comprises one or more of task command parser 636, processor 122c, controller 122, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the command parsing means may include software stored in a processor readable device (e.g., memory) to program a processor to perform parse commands.

For the purpose of this document, the terms "write" and "store" are often used interchangeably, as are the terms "writing" and "storing."

For the purpose of this document, the numeric terms first (i.e., $1^{st}$) and second (i.e., $2^{nd}$) may be used to generally specify an order of when commands (e.g., write commands) are received by a memory controller from a host, as well as to generally specify an order in which data (e.g., $1^{st}$ and $2^{nd}$ data) is to be stored in non-volatile memory. However, it is noted that the term first (i.e., $1^{st}$) should not be interpreted as implying that nothing else precedes it. For example, previous write commands may have been received before a $1^{st}$ write command was received. However, it may be implied that a $2^{nd}$ write command is received at a later point in time than when a $1^{st}$ write command was received, as there terms are being used herein. Similarly, it can be implied that the a $3^{rd}$ write command was received after the $2^{nd}$ write command.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   non-volatile memory;
   non-transitory storage;
   a communication interface configured to receive tasks from a host to access the non-volatile memory, each of the tasks having a task identifier; and
   one or more control circuits in communication with the communication interface, and the non-volatile memory, the one or more control circuits configured to:
   add the tasks to a command queue in the non-transitory storage in increasing order of the task identifiers when in a sequential command execution mode;
   execute the tasks received over the communication interface in increasing order of the task identifiers of the respective tasks when in the sequential command execution mode;
   abort a task having a specified task identifier and all tasks waiting to be executed having a task identifier greater than the specified task identifier without aborting any tasks waiting to be executed having a task identifier less than the specified task identifier in response to receiving a task tail abort command over the communication interface, the task tail abort command having the specified task identifier, including remove the task having the specified task identifier from the command queue without executing the task having the specified task identifier, remove all tasks having a higher task identifier than the specified task identifier from the command queue without executing any of the tasks having a higher task identifier than the specified task identifier, and leave all tasks having a task identifier lower than the specified task identifier on the command queue without executing any of the tasks having a task identifier lower than the specified task identifier, wherein the task tail abort command is received while in the sequential command execution mode; and execute at least one task having a lower task identifier than the specified task identifier after receiving the task tail abort command without again receiving any of the tasks having a lower task identifier than the specified task identifier from the host, the at least one task being a task that was waiting on the command queue to be executed when the task tail abort command was received.

2. The apparatus of claim 1, wherein the one or more control circuits are further configured to:

add a new task having the specified task identifier to the command queue, the new task is added with at least one task having a lower task identifier than the specified task identifier still left on the command queue.

3. The apparatus of claim 2, wherein the one or more control circuits are further configured to:

execute the new task along with the at least one task having the lower task identifier than the specified task identifier still left on the command queue in order of the task identifiers.

4. The apparatus of claim 3, wherein the one or more control circuits are configured to access the non-volatile memory to execute the new task along with the at least one task having the lower task identifier.

5. The apparatus of claim 1, wherein the task tail abort command is a CMD43 command in a Secure Digital protocol.

6. The apparatus of claim 1, wherein the sequential command execution mode is a Sequential CQ mode in a Secure Digital protocol.

7. A method comprising:

entering a sequential execution mode in which tasks received at a memory system are executed by the memory system in increasing order of a task identifier of each respective task;

placing tasks received at the memory system from a host while in the sequential execution mode in sequential order onto a command queue in the memory system, wherein each of the tasks has a different task identifier and includes a command to access non-volatile storage in the memory system;

receiving a task tail abort command at the memory system from the host while in the sequential execution mode, the task tail abort command having a specified task identifier;

in response to receiving the task tail abort command while the memory system is in the sequential execution mode, aborting the task having the specified task identifier and all tasks on the command queue having a higher task identifier than the specified task identifier without aborting any tasks on the command queue having a task identifier lower than the specified task identifier, including removing the task having the specified task identifier and all tasks having a higher task identifier from the command queue;

leaving all tasks having a task identifier lower than the specified task identifier on the command queue in response to receiving the task tail abort command; and executing at least one task from the command queue after receiving the task tail abort command without again receiving any of the tasks having a lower task identifier than the specified task identifier from the host, the at least one task having a task identifier that is lower than the specified task identifier, the at least one task being on the command queue at the time the task tail abort command is received, the executing comprising accessing the non-volatile storage and transferring data between the host and the non-volatile storage.

8. The method of claim 7, further comprising:

receiving a new task at the memory system while in the sequential execution mode, the new task having the same specified task identifier as the specified task identifier in the task tail abort command;

adding the new task to the command queue; and executing the new task with other tasks on the command queue in sequence of task identifiers of the tasks on the command queue, the executing comprising accessing the non-volatile storage.

9. The method of claim 7, wherein the sequential execution mode is a Sequential CQ mode in a Secure Digital protocol.

10. The method of claim 7, wherein the task tail abort command is a CMD43 command in a Secure Digital protocol.

11. The method of claim 7, further comprising:

sending the task tail abort command from the host to the memory system.

12. The method of claim 7, further comprising:

sending "p+1" tasks from a host to the memory system, the tasks having a sequence of task identifiers from 0 to p;

sending the task tail abort command from the host to the memory system after sending the p+1 tasks, the task tail abort command having a task identifier of q, wherein q is greater than 0 and less than "p+1"; and sending a task having a task identifier of "q" from the host to the memory system as the next task after sending the task tail abort command.

13. A non-volatile memory system, comprising:

non-volatile memory;

communication interface means for receiving tasks from a host to access the non-volatile memory, each of the tasks having a task identifier, the communication interface means further for receiving a task tail abort command having a specified task identifier;

command execution mode means for entering a sequential execution mode in which the tasks are executed in increasing order of the task identifier of each respective task;

command queue management means for placing tasks received by the communication interface means while in the sequential execution mode onto a command queue in sequential order of the task identifiers; and task execution means for executing at least one task from the command queue after receiving the task tail abort command without again receiving any of the tasks having a lower task identifier than the specified task identifier from the host, the at least one task having a task identifier that is lower than the specified task identifier, the at least one task being on the command queue at the time the task tail abort command is received;

wherein the command queue management means is further for, in response to receiving the task tail abort command while in the sequential execution mode, aborting the task having the specified task identifier and all tasks on the command queue having a higher task identifier than the specified task identifier without aborting any tasks having a lower task identifier than the specified task identifier, including remove the task having the specified task identifier and all tasks having a higher task identifier than the specified task identifier from the command queue while leaving all tasks having a lower task identifier than the specified task identifier on the command queue.

14. The non-volatile memory system of claim 13, further comprising:

command parsing means for parsing the task tail abort command, including means for interpreting whether an operation code field in the task tail abort command indicates the task tail abort command or another type of abort operation.

15. The non-volatile memory system of claim 13, wherein:

the command queue management means is further for re-placing the task identified in the task tail abort command on the command queue with a new task received by the communication interface means having the same task identifier as specified in the task tail abort command; and task execution means is further for executing the new task, along with tasks on the command queue having a lower task identifier in order of the task identifiers.

* * * * *